United States Patent [19]

Feary et al.

[11] 4,102,274
[45] Jul. 25, 1978

[54] CYLINDRICAL CARGO SECUREMENT APPARATUS AND METHOD THEREFORE

[75] Inventors: Steven L. Feary, Ft. Mitchell, Ky.; Bradley W. Boesel, Cincinnati, Ohio

[73] Assignee: Carriers Securement Systems, Inc., Ft. Mitchell, Ky.

[21] Appl. No.: 659,016

[22] Filed: Feb. 18, 1976

[51] Int. Cl.² .......................... B60P 7/12; B60P 7/16; B61D 45/49; B61D 49/00

[52] U.S. Cl. .................................. 105/367; 105/469; 105/470; 105/482; 214/15 Z; 248/119 R; 280/179 A

[58] Field of Search .............. 105/366 D, 367, 368 R, 105/368 B, 368 S, 380, 475, 476, 479, 482, 469, 470; 114/200; 214/1 P, 10.5 R, 77 R, 152, 620; 248/119 R, 119 S, 328, 499, 500, 503, 505, 510; 280/179 R, 179 A, 179 B, 414 R; 296/28 M

[56] References Cited

U.S. PATENT DOCUMENTS

| | | | |
|---|---|---|---|
| 677,188 | 6/1901 | Drees | 114/200 |
| 1,450,176 | 4/1923 | Hopkins | 248/328 |
| 1,780,277 | 11/1930 | Seeley et al. | 105/368 R |
| 1,988,944 | 1/1935 | Hankins et al. | 105/366 D |
| 2,066,714 | 1/1937 | Butterworth | 105/368 R |
| 3,197,236 | 7/1965 | Burton | 280/179 R |
| 3,299,989 | 1/1967 | Santosuosso | 248/119 R X |
| 3,371,951 | 3/1968 | Bryant | 105/475 X |
| 3,376,062 | 4/1968 | Chosy et al. | 296/28 M |
| 3,387,813 | 6/1968 | Carino | 248/119 R X |
| 3,417,712 | 12/1968 | Pulcrano et al. | 105/368 B X |
| 3,481,627 | 12/1969 | Felburn | 280/179 A |
| 3,568,607 | 3/1971 | Gutridge | 105/368 S |
| 3,637,234 | 1/1972 | Thomas et al. | 280/179 A |
| 3,715,993 | 2/1973 | Orlick | 105/367 |
| 3,740,073 | 6/1973 | Schwiebert | 280/179 A |
| 3,789,775 | 2/1974 | Broling et al. | 105/367 |
| 3,865,047 | 2/1975 | Hlinsky et al. | 105/366 D |
| 3,922,004 | 11/1975 | Chamberlain | 280/179 R |
| 3,938,671 | 2/1976 | Lewey et al. | 214/152 X |
| 4,005,793 | 2/1977 | Smith | 214/620 |

Primary Examiner—Drayton E. Hoffman
Assistant Examiner—Howard Beltran
Attorney, Agent, or Firm—Wood, Herron & Evans

[57] ABSTRACT

A cargo securing system for steel coils, for example, includes, on a supporting platform, two parallel spaced tracks and coil supporting chocks slidably mounted thereon. End chocks are selectively fixed to the tracks to support one end of a coil, while adjustable chocks are slidable to a position to support another end. The adjustable chocks are operably connected to anchors, which are selectively fixed to the tracks, for securing movement against a coil end, and for prevention of subsequent movement along the tracks. Multi-intermediate chocks permit securing multiple coils of different sizes by supporting the adjacent ends of two coils intermediate the end chocks and the adjustable chocks. Storage track sections permit pivoting of the chocks to a storage position to convert the platform to flat-bed use when desired. An "I"-beam chock retainer is provided for cooperation with a particularly defined track.

31 Claims, 9 Drawing Figures

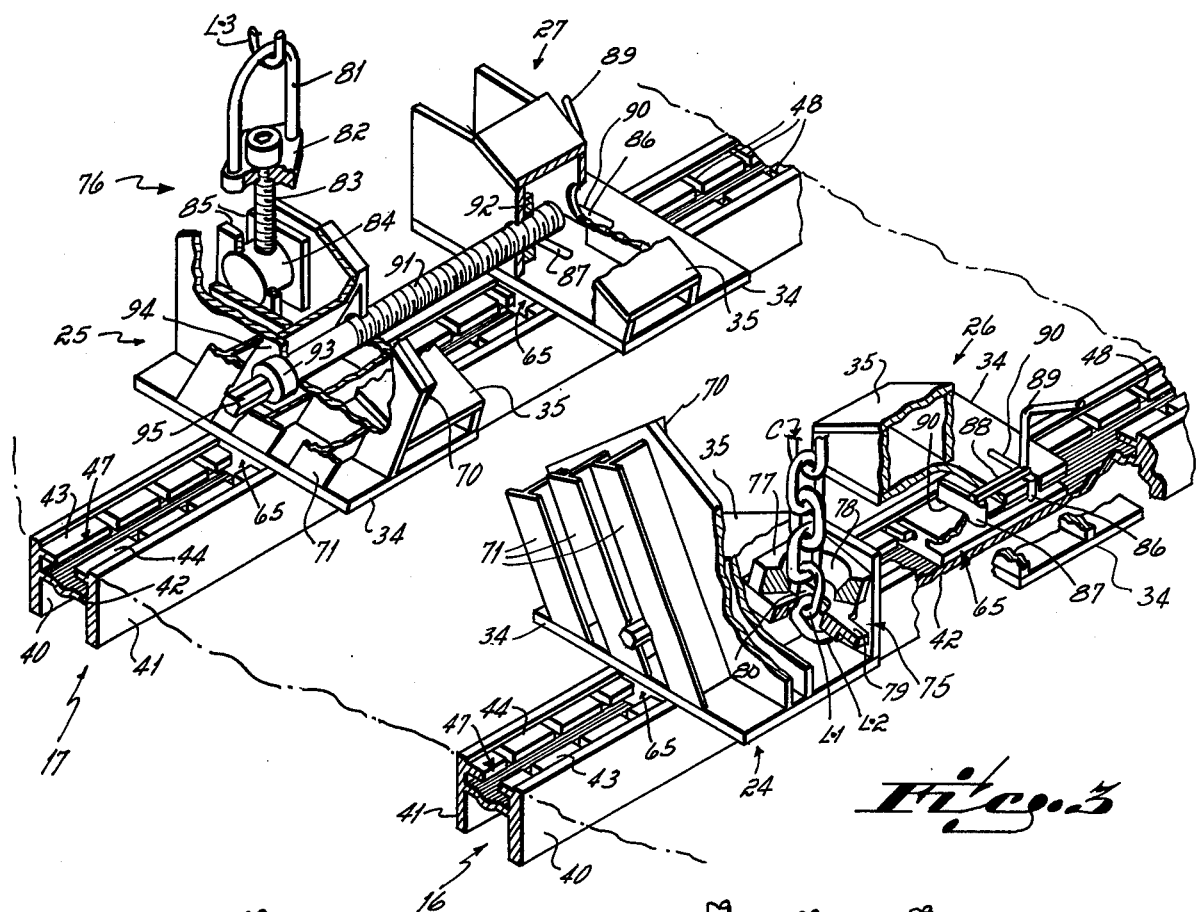
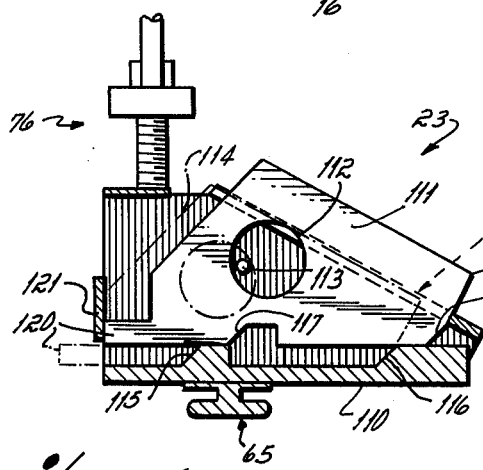
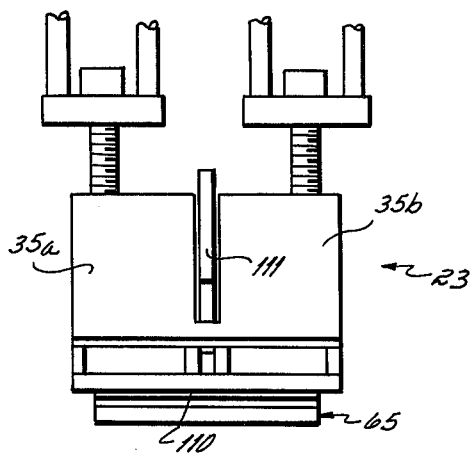
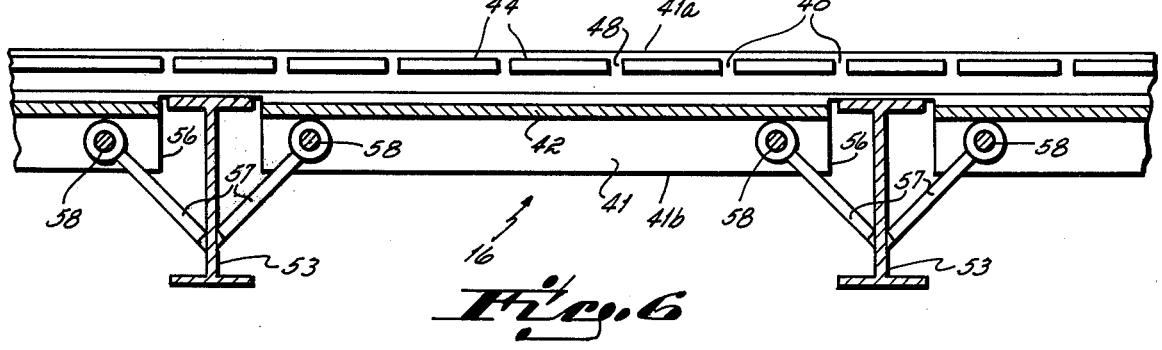

4,102,274

CYLINDRICAL CARGO SECUREMENT APPARATUS AND METHOD THEREFORE

BACKGROUND OF THE INVENTION

This invention relates to apparatus for securing steel coils, and more particularly to apparatus for supporting and securing steel coils to platforms for handling, transportation, and the like.

In one form of freight transportation now in use, cargo is secured to a flat trailer bed and the trailer is pulled over the road by a tractor, or over the rail by a flat car on which the trailer is mounted in "piggy-back" fashion. This method of transportation is desirable in the shipping and handling of steel coils, but has not reached its full potential for such use due to a number of factors.

Specifically, commercial size steel coils normally range from 24 or more inches in width, from 30 to 56 inches in diameter, and typically weigh in the neighborhood of 23,000 pounds, depending on coil size and material. The coils are thus very heavy and are frequently in awkward or unstable configuration, due to erratic diameter and width combinations. When under way, as during transportation, the coils exhibit substantial inertia and this, coupled with their configuration, makes it difficult to secure them handily, without potential damage to them, and safely, without danger of their coming loose. For example, a coil may be about 24 inches in width and about 48 inches, or more in diameter. Coupled with its weight of several thousand pounds, these characteristics make it relatively unstable, as it rests on its side (as opposed to its flat end). Abrupt stops or collisions would tend to topple it if it was not adequately secured.

The Open Top Loading Rules Committee of the Association of American Railroads (A.A.R.) has produced rules governing the construction and performance of all coil securement systems which will be used in inter-rail "piggy-back" transportation. Such systems must satisfy Section 7 of the A.A.R. Rules Governing the Loading of Commodities on Open Top Cars. Currently, applicants are aware of two prior securement systems which have been tested to current satisfaction of the present rules. The first of these is a system known as "wood blocking," wherein a wooden "cradle" is built around the coil in accordance with the specifications in Section 7 of the A.A.R. Rules. The second of these is a system wherein three tracks are placed in a flat bed trailer and chain securing anchor-winches are movable within the tracks to provide chain anchorage of loads at desired angles.

Each of these systems has inherent disadvantages. In the wood blocking system, "cradles" must be constructed for each coil transported, requiring time, labor and material expense. In the other system, wood or other blocks must also be used to block the coils from rolling, for example.

Of course, other railroad car systems for mounting coils have been devised, such as specially outfitted coil carrying cars, for example, but these lack the versatility of "piggy-back" transportation.

It has thus been one objective of this invention to provide improved apparatus for supporting and securing cargo on transportation and handling platforms.

A further objective of the invention has been to provide improved apparatus for supporting and securing steel coils to flat bed trailers for use in "piggy-back" transportation.

A further objective of the invention has been to provide an improved method of loading and securing cylindrical objects such as steel coils, to supporting and handling platforms.

A further objective of the invention has been to provide improved components for use in a steel coil securing system.

A still further objective of the invention has been to provide a coil or load securing system whereby multiple loads or coils of widely varying size can be safely and positively secured with only minor adjustments to the system.

A further objective of the invention has been to provide an improved steel coil securing apparatus for flat bed trailers and including improved apparatus for storing coil supporting chocks, when conversion to a flat trailer bed is desired.

SUMMARY OF THE INVENTION

To these ends, a preferred embodiment of the invention comprises a pair of spaced parallel tracks mounted to a supporting platform such as a pallet or a flat bed trailer. Coil supporting chocks are slidably mounted to the tracks. Two end chocks are selectively fixed to respective tracks, opposite one another, for supporting one end of a steel coil, for example. Adjustable chocks are disposed opposite one another in respective tracks to support an opposite end of the coil. These chocks are connected to an anchor means (which is slidably mounted, but selectively secured, to the respective track, via operable means for moving the adjustable chock against the coil end and holding it there. The adjustable chocks are thus held against movement along the track via their connection to the selectively fixed anchor means.

In use, the chocks are preliminarily placed in position to receive a particular coil or other cargo load. The load is then placed on the chocks, and the adjustable chocks are moved against the load to finally secure it. Flexible ties such as chains are used to secure the coils to the respective chocks.

The invention contemplates securement of a plurality of different size coils and to this end further includes a pair of multi-intermediate chocks, each multi-intermediate chock disposed opposite the other, in respective tracks, and between a respective end chock and adjustable chock in the same track. The multi-intermediate chocks support abutting ends of two differently sized coils, while the end chocks support a forward end of a first coil and the adjustable chocks support a rearward end of a second, different coil.

To provide versatility, for accommodation of varying coils or other loads, the chocks are movable along the tracks to any number of varied positions, being slidably held therein by elongated "I"-beam retainers uniquely cooperating with the particular track structure. Specifically, each track includes two elongated side walls, joined by a connecting web, intermediate upper and lower side wall edges. Elongated projections extend inwardly from each side wall, intermediate the upper side wall edge and the connecting web, but terminate at an edge short of the opposing projection to define an elongated slot. An "I"-beam retainer is fixed to each chock and resides in a track such that the bottom flange slidably engages the connecting web to support the chock thereon. The upper flange of the "I"-beam retainer overlies, but is spaced from, the side wall projections and is connected to the bottom flange via an elongated vertical web. Outside edges of both upper and lower flanges slidingly engage a surface of one side wall to prevent the vertical web from engaging the edges of the side wall projections.

In order to convert the flat bed trailer, for example, from a coil-transporting adaptation, to a flat bed as when other cargo is to be handled, the spaced tracks include movable chock storage areas which include pivotable track sections. Chocks are slid onto these sections which are then pivoted beneath the upper surface of the flat bed to store the chocks in a "well". Baffle plates are automatically positioned between the normal load bearing track sections and the storage track sections to prevent remaining chocks from sliding off the tracks when the storage section is in a storage position.

These and other objectives and advantages will become readily apparent from the following detailed description and drawings in which:

DESCRIPTION OF THE DRAWINGS

FIG. 3 is a break-away perspective view of the rearwardmost adjustable chocks and anchors at the rear end of the trailer of FIG. 1;

FIGS. 4 and 5 illustrate details of a multi-intermediate chock;

FIG. 6 is a cross-sectional view of a track in elevation;

Turning now to the drawings, the coil securement apparatus 10 is shown mounted on a flat bed trailer 11. While the invention herein will be described in connection with its use on a flat bed trailer, it should also be appreciated that the invention is readily adapted for use on any cargo or load supporting platform such as, for example, a railroad car of the flat car or gondola car type, or on a pallet which could be loaded onto a trailer, railroad car or other transportation or cargo handling means.

As shown in FIG. 10, a preferred embodiment of the invention is constructed to support and secure two coils 12 and 13 on the trailer 11, although the preferred embodiment is able to handle a single coil as well. The coils vary greatly in diameter and width (i.e., length) but this constitutes no problem since the invention readily handles such variations as described herein.

Figure 8:
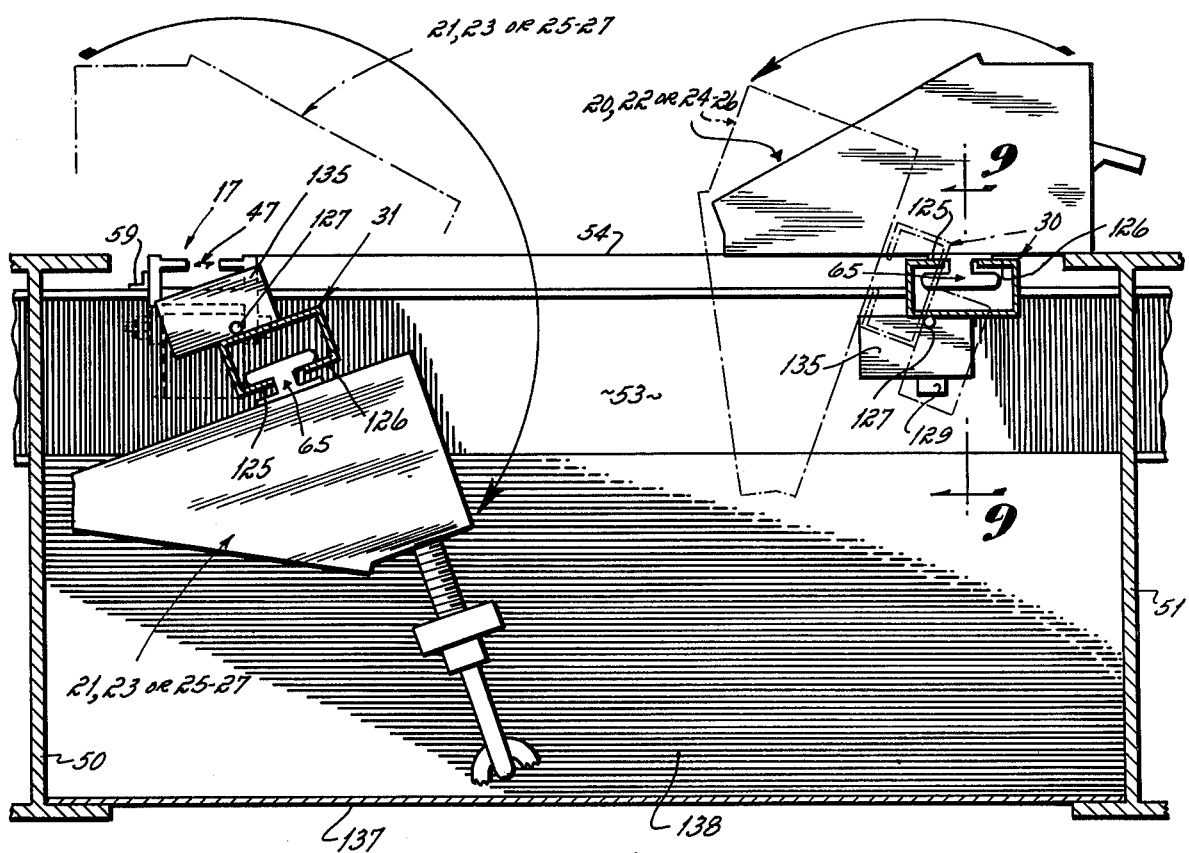
FIG. 8 is a cross-sectional illustrative view of a storage section taken along lines 8—8 of FIG. 1 and showing representative chocks thereon.
Figure 9:
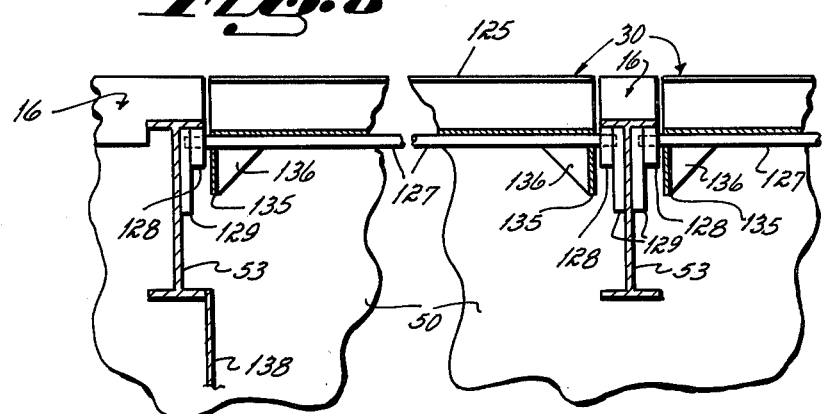
FIG. 9 is a cross-sectional view taken along lines 9—9 of FIG. 8.

Essentially, the invention contemplates two spaced, parallel tracks 16 and 17 mounted in the trailer 11. For clarity, track 16 is referred to as a right-hand track and track 17 is referred to as a left-hand track, as viewed from the rearward end 18 of the trailer 11. The invention further contemplates selectively fixable end chocks 20 and 21, multi-intermediate chocks 22 and 23, adjustable chocks 24 and 25, and anchoring means comprising anchoring chocks 26 and 27. For clarity, chocks 20, 22, 24 and 26 are considered to be right-hand chocks while chocks 21, 23, 25 and 27 are considered to be left-hand chocks as viewed from the rearward end of the trailer 18. The tracks 16 and 17 constitute load bearing sections which are aligned with non-load bearing sections of tracks 30 and 31. The storage sections are shown in FIGS. 8 and 9 and will be discussed hereinafter in more detail.

Figure 1:
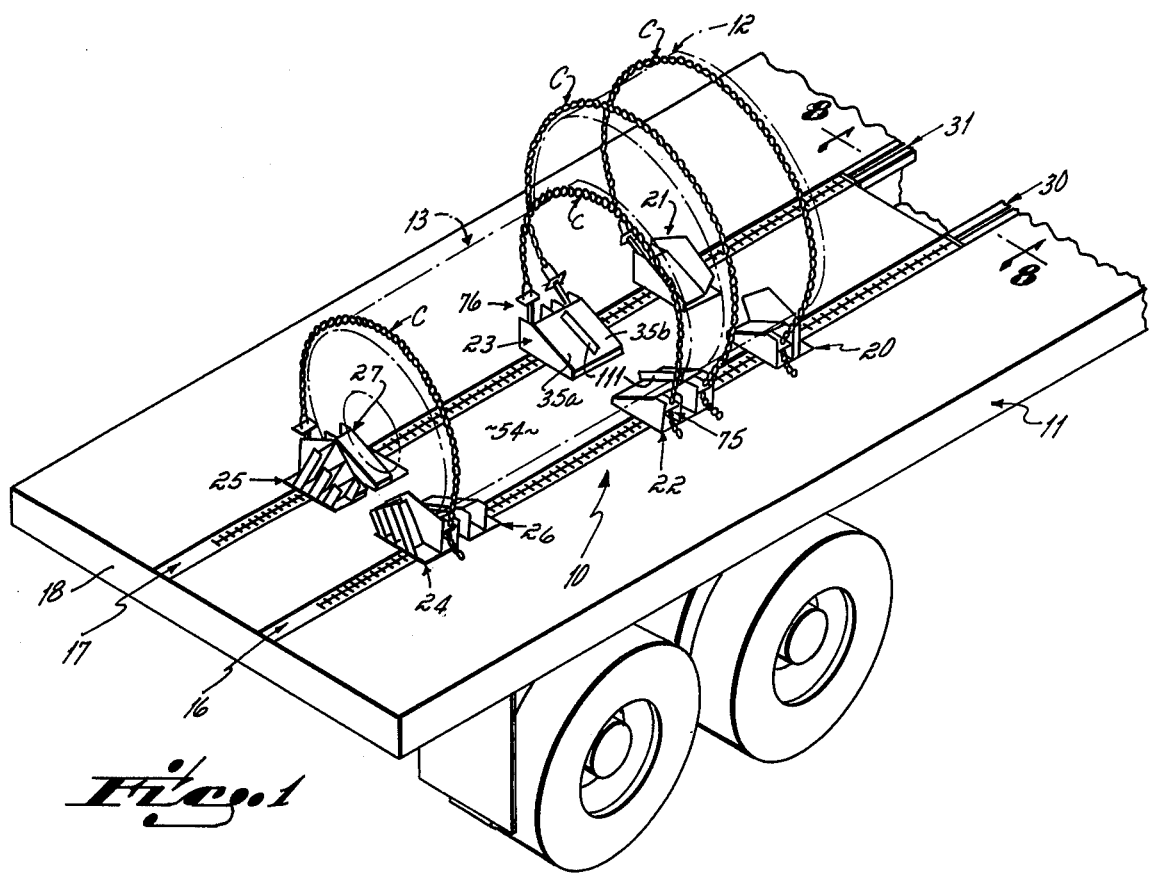
FIG. 1 is a perspective view of a preferred embodiment of the invention adapted for use on a flat bed trailer.
Figure 2:
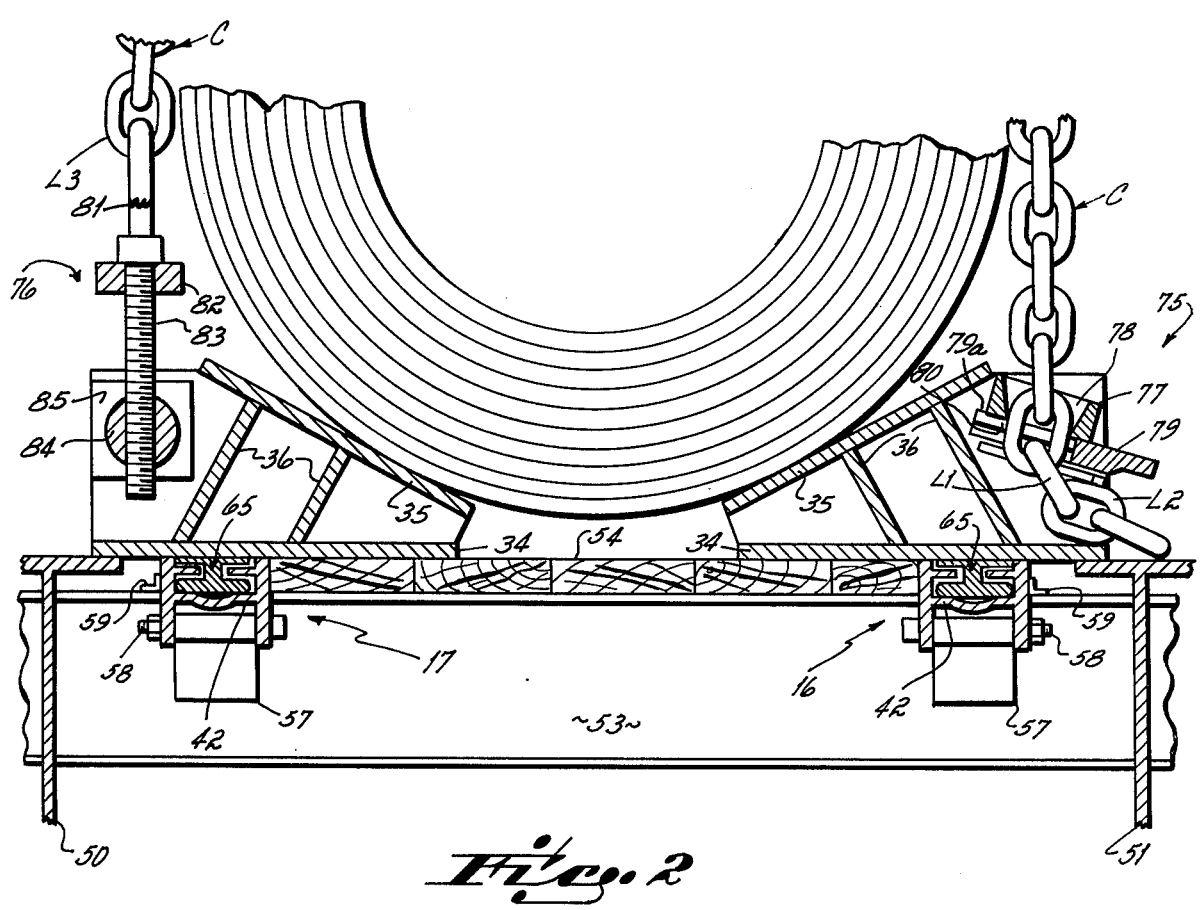
FIG. 2 is a cross-sectional view, taken through a central position of the trailer bed of FIG. 1, illustrating pertinent features of the invention.

Turning now to a description of the coil supporting chocks, various features thereof are shown in FIGS. 1 through 5. FIG. 2 is representative of the construction of each chock, although various ones of the chocks incorporate further features as well. The chocks each comprise a relatively flat bottom plate 34, and an inclined coil supporting plate 35, like surfaces and elements in each chock being identified on the drawings by the same reference numeral. Each of the chocks incorporates reinforcing elements such as at 36, the reinforcing elements supporting the coil support plate 35. In use, the bottom plates 34 of the chocks are generally horizontally disposed while the inclined coil supporting plates 35 are inclined to the horizontal and downwardly toward a central part of the trailer 11, in order to support coils against rolling transversely of the trailer.

Figure 7:
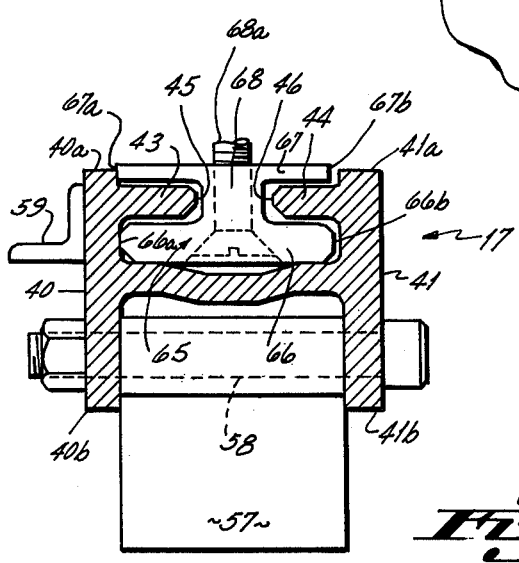
FIG. 7 is a cross-sectional end view of a track and shows an "I"-beam chock retainer therein.

Turning now to a description of the tracks 16 and 17, and the trailer bed in which they are mounted, the track is best seen in FIGS. 6 and 7. The tracks include generally vertically disposed side walls 40 and 41 connected by a connecting web 42 intermediate the upper edges 40a and 41a and lower edges 40b and 41b, as shown in FIG. 7. The track further includes opposite side wall projections 43 and 44, each of which extend inwardly of their respective side wall and terminate in elongated edges 45 and 46, respectively, to form an elongated slot 47 therebetween as seen in FIG. 3. It is convenient to form the track from a high strength aluminum by an extrusion process and thereafter to cut or mill it as described herein. Of course, it could be formed of other materials or processes.

In a preferred embodiment of the invention, the track is mounted in a flat bed trailer 11. The trailer includes elongated main support beams 50 and 51, and a plurality of supporting cross-beams 53. The mounting of the track to the trailer is best shown in FIG. 6. Normally, the trailer bed comprises an upper flat load supporting surface 54 made up, for example, from a plurality of wood strips such as treated hard-wood planking or other wooden flooring. When the tracks are to be mounted on a trailer bed, several planks adjacent the inward upper edges of the beams 50 and 51 are removed to make room for the track (or, or course, the track is simply inserted and mounted prior to the time the floor or surface 54 is assembled to the trailer).

FIG. 6 shows a typical track 16 as mounted on the cross-beams 53 of the trailer. Each track includes a plurality of cut-outs 56 to accommodate the upper flanges of the cross-beams 53. The track is laid on the cross-beams 53 and is secured thereto by means of braces 57 which are bolted, as at 58, to the lower portions of the respective side walls 40 and 41 of the track as shown in FIG. 7. To further support the tracks on the cross-beams, small bracing angles 59, as seen in FIG. 2, are attached to the upper surfaces of the cross-beams and support the outer side walls of each track.

In order to slidably mount each of the chocks to the tracks, each of the chocks is provided with an elongated "I"-beam chock retainer 65, best seen in cross-section in FIG. 7. The "I"-beam chock retainer 65 comprises a bottom flange 66 and a top flange 67 connected to each other via an elongated, vertically disposed web 68. The bottom flange 66 and the top flange 67 have outer edges 66a and 66b, and 67a and 67b, respectively. The dimensions of each of the bottom and top flanges is such that the outer edges, for example 66a and 67a, will engage the side wall 40 prior to such time as the web 68 would engage the elongated edge 45 of the side wall projection 43. In like manner, the width of the flanges is such that the outside edges 67a and 67b will engage the side wall 41 of the track prior to the time the web 68 would engage the elongated edge 46 of the side wall projection 44. Moreover, and as specifically shown in FIG. 7, the structural and cooperative relation of the "I"-beam retainer 65 to the track is such that the bottom of the "I"-beam retainer rests on the connecting web 42, while the upper flange 67 of the "I"-beam retainer overlies, but does not engage, the side wall projections 43 and 44. Screws 68a serve to attach the "I"-beam retainers to the chocks.

As shown in FIG. 2, when the chocks are loaded, the "I"-beam retainer provides major support for the chocks upon the connecting webs 42, the respective outer edges of the upper and lower flanges of the "I"-beam chock retainer engaging the outer walls of the tracks before the webs 68 of the retainers can engage the edges of the projections 43 or 44. This insures, for example, that the "I"-beams will not be obstructed by the edges of the projections 43 and 44 when it is desired to move the chocks along the track.

In addition to these features, each track is provided with a series of oppositely disposed, transverse slots 48 for providing means by which certain of the chocks can be selectively fixed against movement along the tracks. Such slots can be cut into the side wall projections after the track is extruded.

Turning now to a description of the chocks 24 and 25, and the anchoring means or chocks 26 and 27, the structure of these components is best shown in FIG. 3. Each of the chocks 24 and 25 include an inclined coil support plate 35 and a coil end abutment member 70, which is supported and reinforced by a plurality of reinforcing members such as shown at 71. The chock 24 further includes a chain retaining means 75 and a chain tightening means 76.

The chain retaining means 75 includes a chain stop abutment member 77 having a chain receiving aperture 78 therein. A slidable chain stop 79 is positioned beneath the stop abutment plate 77. When a chain, such as that shown at "C," is extended through the aperture 78, the slidable chain stop 79 can be moved to the left and into the position shown in FIG. 2, wherein a slot 80 of the slidable chain stop 79 engages a chain link L-1 to hold the chain against upward movement by virtue of the stop's engagement with following link L-2. When the chain is tensioned, the stop 79 is drawn against abutment 77. A small "ear" 79a prevents the stop 79 from sliding rearwardly out of chain retaining position. Relaxation of the chain permits the "ear" to drop from engagement with abutment 77 and thus the stop 79 can be released.

On the other hand, the chain tightening apparatus of chock 25 includes a U-shaped member 81 connected to a chain link L-3. The member 81 is non-movably connected to a plate 82, and a bolt 83 extends through a plate 82 into a cylindrical member 84 which is mounted in a chock 24 via the cylindrical mounting plates 85. After the chain has been pulled over the top of a coil such as, for example, in FIG. 2, and is latched by retainer 75, the chain tightening means 76 is operated to tighten the chain over the top of the coil by turning the bolt 83. Of course, the cylinder mounting plates 85 comprise apertures for rotatably receiving the cylinder 84. The rotatable cylinder can thus be pivoted to permit chain positioning over coils of varying diameters. Each of the chocks 20, 21, 22, 23, 24 and 25 is provided with at least a chain retaining means or a chain tightening means 75, 76 in order to secure coils thereon. Thus, for example, each of the chocks 21, 23 and 25 include chain tightening means 76, while each of the chocks 20, 22 and 24 include chain retaining means 75. The multi-intermediate chocks 22 and 23 respectively contain two of the respective chain retaining or tightening means 75 and 76.

Each of the end chocks 20 and 21 and each of the anchoring means or chocks 26 and 27 are provided with means for securing the chocks against movement along the tracks. These means comprise, in each chock, two stop tabs 86 and 87, shown in partial detail only in the anchoring means 26 and 27 in FIG. 3. The tops of the stop tabs are connected by a connecting bar 88, and the tabs are operated by a stop tab handle 89. To accommodate the stop tabs 86 and 87, slots 90 are provided in the respective "I"-beam retainers of the chocks. The slots extend through the top flange of the "I"-beam retainer, through the vertical web, and into the bottom flange of each "I"-beam retainer.

When it is desired to selectively secure a chock to a track, the chock is moved to a position which corresponds to the transverse slots 48, at some position along the track. The stop tab handle is then lowered to lower the stop tabs through slots 48, the side wall projections 43 and 44 and partially through the "I"-beam retainer. Accordingly, the chocks 20 and 21, and the anchoring means 26 and 27, can be fixed at various positions along the tracks 16 and 17.

As shown in FIG. 3, the chocks 24 and 25 are not provided with stop tabs, but are secured to the anchoring chocks 26 and 27 via an operable connecting screw 91. The screw connecting chocks 26 and 24 is not shown, for clarity reasons, in FIG. 3; however, the screw 91 is shown in detail with respect to chocks 25 and 27. As shown, the screw 91 is threadably engaged in the chock 27 as by a nut 92 and is operably connected or engaged with the chock 25 as by means of an integral portion or collar 93 engaging plate 94 of the chock 25. Thus, when the screw is turned, as by applying a torque to the hex head 95, the adjustable chock is moved against the end of a coil, (assuming, of course, that the anchoring chock 27 is affixed to the track 17). Likewise, chock 24 can be drawn toward chock 26.

In FIGS. 4 and 5, the pertinent details of the multi-intermediate chocks 22 and 23 are shown. Only chock 23 is shown in each Figure, but it will be understood that it is representative of the construction of chock 22, opposite hand. Of course, chock 23 is provided with chain tightening means 76 while the oppositely disposed chock 22 is provided with chain retaining means 75.

Each of the multi-intermediate chocks 22 and 23 is provided with a relatively flat horizontal bottom member 110 and an inclined coil supporting plate 35 comprising coil supporting surfaces 35a and 35b. Each of the chocks is also provided with an "I"-beam chock retainer 65, as already has been described. The multi-intermediate chocks do not include stop tabs, and the chocks are slidably mounted in the respective tracks 16 and 17 by virtue of the chock retainers 65.

Each of the multi-intermediate chocks includes a retractable separator plate 111, which is movable between a projected or extended position, as shown in FIGS. 4 and 5, and a retracted position as shown in phantom lines 114 in FIG. 4. This plate functions to separate the adjacent ends of the two different coils 12 and 13, for example, when multiple coils are mounted on the securement apparatus. Each of the plates incorporates an aperture 112 and is captured within the chock by a rod 113 extending transversely through the aperture. Thus, the rod maintains the plate from extension, much further than is shown in FIG. 4, and yet the aperture permits the retraction of the plate to its retracted position as shown in the phantom lines 114. The bottom plate 110 is provided with inclined surfaces 115 and 116 for cooperation with similarly inclined surfaces 117 and 118 on the plate 111. In use, the separator plate 111 can be retracted by grasping it, such as near its forward corner 119, and by turning the plate generally upwardly so that the rear projection 120 slides beneath the chock plate 121. The plate can then be retracted. To extend the plate from its retracted position 114, the rear projection 120 is simply pushed downwardly so as to move corner 119 in an upward direction where it can be grasped and pulled upwardly and forwardly. The inclined surfaces 115 and 117, and 116 and 118 respectively, cooperate to facilitate extension of the plate.

When only a single coil is to be transported on the securement apparatus, the plate 111 is retracted. The multi-intermediate chock thus presents a relatively flat face to an intermediate portion of the coil and the coil is therefore free to rest on all the chocks.

The end chocks 20 and 21 are constructed similarly to the chocks 24 and 25 except the end chocks include stop tabs, such as those described above, and do not include a positioning screw or cooperating anchoring means. Of course, the selectively fixable end chocks could be constructed with these features for mounting multiple or single coils if the advantages of adjustment were desired on the forward end as well (and assuming such structure could withstand anticipated forces during transportation). Each of the end chocks includes a reinforced coil end or abutment surface as shown, similar to the corresponding elements 70 on chocks 24 and 25.

FIGS. 8 and 9 illustrate the storage of the chocks beneath the upper surfaces 54 of the flat bed 11. In the event that it is necessary to utilize the flat bed of the trailer to carry other forms or types of cargo, the chocks are pivoted beneath the surface 54, where they are out of the way but are ready for immediate use or reconversion of the trailer for coil carrying.

It is anticipated that more than one coil securement system can be used on each flat bed trailer. Thus each coil securement system constitutes at least two sets of chocks, each set of chocks comprising a selectively securable end chock, a multi-intermediate chock, an adjustable chock and an anchoring means or chock associated with the adjustable chock. In this regard, storage areas are provided along the trailer bed in each respective track for all of the chocks which are used on the beds, the number of storage areas depending on the number of securement systems and chocks used on each bed. Since the cross-beams 53 of the trailer are mounted relatively close together, each chock storage area comprises a plurality of pivotable storage tracks, one independent storage track section mounted between the two cross-beams.

When it is desired to store a chock, the chock is moved onto an empty storage track section 30 or 31 as shown in FIG. 8. The storage track sections 30 and 31 are shaped in the form of a rectangular tube having a slot in the top thereof to accommodate the web of the "I"-beam chock retainer. Accordingly, the storage tracks 30 and 31 are mounted in the trailer such that the upper portions 125 and 126 are essentially aligned with the side wall projections 43 and 44 of the respective tracks 16 and 17. Accordingly, the chocks can be easily moved from the tracks 16 and 17 onto a respective storage track 30 or 31.

Each of the storage tracks is connected to a rod member 127 which is pivotally mounted at each end to a plate 128 for rotatably holding the rods 127. The plates 128 are connected to plates 129 which are connected to the webs of the cross-support beams 53. Thus, the storage tracks can be assembled to the trailer by inserting the rods into the plates 128 and 129 and raising the complete unit up into position between the cross-beams 53. The storage sections 30 and 31 can be held in aligned position by stops, not shown, welded to the main "I"-beams for example. As shown in FIG. 9, sections of track 16 can be mounted on the top of the flanges of the cross-beams to provide continuity between the pivotable track sections.

Each of the storage track sections is further provided with a baffle plate 135 at each end thereof. The baffles are connected to the bottom of the storage track, as by welding, and are reinforced by means of a gusset 136. When the storage track is pivoted, as shown in FIG. 8, to a storage position, the baffle plates 135 are raised to the position as shown in the left hand track of FIG. 8. The baffle plates thus block the path which would thus be taken by the "I"-beam retainer of any chock remaining on the track or on an adjacent storage track. The baffle thus prevents any remaining chock from being taken off or from removal from the track via the storage area.

If desired, a steel plate 137 can be secured to the bottom flanges of the main support beams 50 and 51 in order to provide a floor through the chock storage sections. This provides an enclosed well for containing the chocks and chains, for example, against road moisture and debris from beneath the trailer. End plates 138 are provided between the bottom of the cross-support beams 53 and the floor plates 137 to provide ends for the storage well.

In the storage areas, it will be appreciated that the surface 54 of the trailer 11 must be removed to allow the chocks to be pivoted thereunder. In this regard, a removable plate or cover is provided to cover the storage well whether or not the storage section is in use.

In use, as for example with the coils as shown in FIG. 1, end chocks 20 and 21 are selectively secured to the respective track in the desired position. Thereafter, separator plates 111 are extended and the multi-intermediate chocks 22 and 23 are moved into position to receive the coil 12. The coil 12 may be lowered toward the chocks and against the coil end abutments of chocks 20 and 21. The coil is held just above these chocks while the chocks 22 and 23 are manually moved against the rearward end of the coil where the plates 111 abut the end of the coil. The coil is then finally lowered onto chocks 20 and 21 and onto coil support surfaces 35b of the chocks 22 and 23.

Thereafter, the adjustable chocks 24 and 25 are moved to an approximate position for receiving the coil 13 and the stop tabs, associated with the anchoring chocks 26 and 27, are inserted into the track. Further adjustment of screws 91, if needed, places the adjustable chocks in a proper position. The coil is then lowered onto the multi-intermediate chock surfaces 35a, the anchoring chocks 26 and 27, and the adjustable chocks 24 and 25. Thereafter, the chocks 24 and 25 are adjusted via screws 91 to move the respective chocks 24 and 25 against the rearward end of the coil 13 and thereby secure the coil between the retractable plates 111 of the chocks 22 and 23 and the abutment surfaces 70 on the chocks 24 and 25.

Of course, it is not necessary that the anchoring chocks 26 and 27 comprise coil supporting chocks, nor is it necessary that they are mounted between the multi-intermediate chocks and the adjustable chocks. These chocks (26,27) may be modified to comprise simple anchoring means for chocks 24 and 25, and may be disposed on either side of chocks 24 and 25 as will be appreciated.

In addition, of course, and where only one coil is to be mounted, the multi-intermediate chocks may be omitted. If not omitted, of course, the plates 111 are simply retracted to provide flat support for the coil. After the coil or coils have been loaded onto the chocks, the respective chains as shown are drawn around the coil to securely mount them thereon.

Accordingly, the invention provides a cargo securing system and apparatus for fastening, in particular, steel coils on flat bed trailers in a safe and secure manner for piggy-back transportation, whereby the trailer is either pulled over the road by a truck, or is mounted on a railroad flat car. Alternatively, the invention may be used with or without the storage track feature on any form of support platform where the coils are mounted on the coil pallets which are thereafter handled in a desired manner. Moreover, the securing system disclosed herein can be readily adapted for receiving cargo other than steel coils and of varied shapes and sizes. These and other modifications and advantages will become readily apparent to those of skill in the art, without departing from the scope of the invention, and applicants intend to be bound only by the claims appended hereto.

We claim:

1. Apparatus for securing objects to supporting platforms and including:
   a pair of spaced apart parallel elongated tracks attached to said platform;
   a pair of end chocks, each one of said end chocks selectively fixed to a respective track;
   a pair of adjustable chocks, each one of said adjustable chocks slidably mounted in a respective track;
   a pair of anchor means, each of said anchor means being movable along its respective track and being selectively fixable to a respective track proximate an adjustable chock, and
   means operatively connecting each adjustable chock to a respective anchor means for moving said adjustable chocks against an end of said object and with respect to said anchor means when said anchor means is selectively fixed to said respective track.

2. Apparatus as in claim 1 wherein said objects to be secured are substantially cylindrical and wherein said anchor means comprise at least two anchoring chocks, each one selectively fixed to respective tracks intermediate an end chock and an adjustable chock.

3. Apparatus as in claim 2 wherein said operative connecting means comprises a screw threadably engaged in one of said adjustable and anchoring chocks and operatively engaging the other of said adjustable and said anchoring chocks.

4. Apparatus as in claim 2 wherein said end chocks and said adustable chocks include object abutment surface means for engaging the ends of said object.

5. Apparatus as in claim 2 wherein each of said chocks includes a substantially flat, horizontally disposed bottom surface, and a cylindrical object supporting surface inclined at an angle from the horizontal, and wherein each of said chocks include elongated chock retaining means attached to said bottom surface and cooperating with said tracks to maintain said chocks thereon, said retaining means supporting said chocks on a bottom member of said tracks.

6. Apparatus as in claim 5 including chain means attached to said chocks for securing said cylindrical objects, wherein said end chocks and said adjustable chocks are disposed opposite each other in respective tracks, one of each of said end chocks and said adjustable chocks having releasable chain retaining means thereon and an opposite respective end chock and adjustable chock include means for tightening said chains around said cylindrical object.

7. Apparatus as in claim 2 wherein said chocks include chock retaining means slidably mounted and captured within said tracks for securing said chocks against movement outwardly of said tracks.

8. Apparatus as in claim 7 wherein said tracks include a plurality of transverse slots therein and wherein said end chocks and said anchoring chocks include stop tab means movably mounted thereon for selective insertion into said slots and for holding said end chocks and said anchoring chocks against sliding movement along said tracks.

9. Apparatus as in claim 7 wherein each of said tracks include two elongated side walls, an elongated bottom member connecting said side walls and an elongated projection extending inwardly from each of said side walls toward an opposite wall and intermediate top edges of said side walls and said bottom member.

10. Apparatus as in claim 9 wherein said side walls extend beneath said bottom member.

11. Apparatus as in claim 10 including track securing means attached to said side walls beneath said bottom members for securing said trackss to said platform.

12. Apparatus as in claim 9 wherein said projections extend inwardly toward an opposite projection on the opposite side wall, said projections being of a width less than the distance between said side walls and edges of said projections defining a slot for receiving said chock retaining means.

13. Apparatus as in claim 12 wherein said chock retaining means includes a bottom flange slidingly captured between said bottom member and said projections, said flange slidably engaging said bottom member.

14. Apparatus as in claim 13 wherein said bottom flange includes an outer edge engaging one of said side walls.

15. Apparatus as in claim 13 wherein said chock retaining means further includes a top flange overlying and spaced from said projections.

16. Apparatus as in claim 15 wherein a respective outer edge of each of said bottom and top flanges engage one of said side walls.

17. Apparatus as in claim 7 wherein said tracks comprise load bearing sections for securing said cylindrical objects, and pivotable chock storage sections, for storing said chocks beneath an upper surface of said supporting platform, each of said chock storage sections including a storage track section pivotally mounted to said platform, said pivotable storage track sections in one position defining extensions of each of said spaced apart load bearing sections, said chocks being slidable onto said pivotable track sections, and said pivotable track sections being movable to a storage position whereby said chocks are pivoted beneath said upper surface.

18. Apparatus as in claim 17 wherein said chock retaining means cooperate with said pivotable track sections to secure said chocks from moving transversely away therefrom.

19. Apparatus as in claim 17 further including baffle means operatively connected to said pivotable track sections for blocking chocks on said spaced apart load bearing tracks from sliding outwardly thereof, at a storage section, when said pivotable storage tracks are in a storage position.

20. Apparatus as in claim 19 wherein said baffle means comprise a blocking plate mounted on said pivotable storage track and movable to blocking position proximate an end of said load bearing track when said chock storage track section is pivoted to a storage position.

21. Apparatus as in claim 7 further including a pair of multi-intermediate chocks disposed in opposite positions on respective tracks between respective ones of said adjustable chocks and said end chocks.

22. Apparatus as in claim 21 wherein said multi-intermediate chocks include cylindrical object supporting surface means for supporting adjacent ends of two cylindrical objects, a forward end of a first object resting on said end chocks and a rearward end of a second object resting on at least said adjustable chocks.

23. Apparatus as in claim 22 wherein one of said multi-intermediate chocks includes means for capturing a load securing chain, and another of said multi-intermediate chocks includes means for tightening a chain about an object on said chocks.

24. Apparatus as in claim 22 including retractable, vertically disposed, plate means dividing said object supporting surface means for separating said adjacent ends of said objects, and being retractable to permit all of said multi-intermediate chocks to support the intermediate area of a single cylindrical object.

25. Apparatus as in claim 24 wherein said plate is provided with an aperture and wherein said multi-intermediate chock includes a rod extending through said aperture to permit operable movement of said plate, but to prevent removal of said plate from said chock.

26. Apparatus for securing steel coil material in elongated web form, comprising a wound cylindrical coils, to a supporting platform and including:
two elongated parallel tracks attached to said platform;
at least one set of at least three chocks slidably mounted on each of said tracks, each of said three chocks slidably mounted thereon, two of the chockes in a set including means for selectively securing each to its respective track, and against movement along said track, and each set further including an adjustable chock slidably mounted in a respective track proximate a selectively secured chock, and
means operably connecting said adjustable chocks to respective selectively secured chocks for moving the adjustable chocks, with respect to the secured chocks, against the end of a coil mounted thereon.

27. A method for securing steel coils to a supporting platform provided with spaced parallel tracks, a plurality of end and anchoring chocks slidably mounted and selectively secured to said tracks, and two adjustable chocks slidably mounted on said tracks and connected to anchoring chocks by means for operably moving the adjustable chocks against a coil and for holding said adjustable chocks, through said anchoring chocks, against movement along said tracks, the method comprising:
selectively securing end and anchoring chocks to respective parallel tracks;
adjusting the position of said adjustable chocks to permit loading a coil onto all of said chocks;
placing a coil on said chocks;
moving the adjustable chocks against an end of a loaded coil by operating said means for moving said adjustable chocks and thereby moving the adjustable chocks with respect to the anchoring chocks and thereby against, said coil, and;
holding said adjustable chocks against said coil and against movement along said tracks through said means operably connecting each adjustable chock to a respective anchoring chock by maintaining said means for operably moving the adjustable chocks against the coil in a stable condition.

28. Apparatus for supporting and securing at least single cylindrical objects to a supporting platform and including:
a pair of spaced parallel tracks attached to said platform;
object supporting chock means mounted on said tracks for sliding movement along said tracks, said chock means including a forward end chock adapted to be selectively fixed to each of said tracks, a multi-intermediate chock slidably mounted on each of said tracks, an anchoring chock slidably mounted on each of said tracks and adapted to be selectively fixed to said tracks, and an adjustable rearward end chock slidably mounted on each of said tracks proximate respective ones of said anchoring chocks;
means adjustably connecting the respective adjustable end chock on each track to a respective anchoring chock, mounted on the same track, for adjustably anchoring each adjustable rearward end chock to its respective anchoring chock and for moving said adjustable chocks to the respective anchoring chocks against a cylindrical object when said anchoring chocks are fixed on said tracks, and
said multi-intermediate chocks including a retractable object separator means for separating the adjacent ends of objects mounted on said chocks, and being retractable to permit securement and support of a single object on all of said chocks.

29. In apparatus for securing objects to platforms and including parallel elongated tracks and object supporting chocks secured thereto, an improvement in said tracks wherein each track comprises:
two elongated side walls, each having top and bottom edges;

an eongated connecting web extending between and connecting said side walls intermediate said top and bottom edges, and an elongated side wall projection extending inwardly from each of said side walls toward the other side wall intermediate said top edges and said connecting web, each of said projections terminating in an elongated edge proximate an edge of an opposite projection and said edges defining an elongated first slot, wherein said tracks slidably support object supporting and securing chock means, and further including:

elongated retainers slidably captured in said tracks and attached to said chock means, said retainers including a bottom flange slidably disposed between said connecting web and said side wall projections, and a top flange overlying said side wall projection and connected to said bottom flange by a vertical elongated web, said bottom flange engaging said elongated connecting web of said track to support said chocks thereon, and said top flange of said retainer being spaced from top surfaces of said side wall projections of said track, said top and said bottom flanges including side edges slidingly engagable with a side wall of said track, and said vertical elongated web having a thickness less than the width of said elongated slot and being spaced from the elongated edges of said side wall projections when the side edges of said bottom and top flanges engage a side wall of said track.

30. In a vehicle of the type having a flat bed, apparatus for securing objects to the bed and including:
   a pair of spaced apart parallel elongated tracks attached to said flat bed;
   a pair of end chocks, each one of said end chocks selectively fixed to a respective track;
   a pair of adjustable chocks, each one of said adjustable chocks slidably mounted in a respective track;
   a pair of anchor means, each of said anchor means being movable along its respective track and being selectively fixable to a respective track proximate an adjustable chock,
   means operatively connecting each adjustable chock to a respective anchor means for moving said adjustable chocks against an end of said object and with respect to said anchor means when said anchor means is selectively fixed to said respective track; and
   wherein said flat bed includes elongated main support beams and cross-beams, and wherein said tracks are secured to said cross-beams.

31. Apparatus as in claim 30, wherein said tracks include storage track sections pivotally mounted to said cross-support beams.

* * * * *

UNITED STATES PATENT AND TRADEMARK OFFICE
CERTIFICATE OF CORRECTION

PATENT NO. : 4,102,274
DATED : July 25, 1978
INVENTOR(S) : Steven L. Feary and Bradley W. Boesel It is certified that error appears in the above-identified patent and that said Letters Patent are hereby corrected as shown below:

In the title, "Therefore" should be --Therefor--

Col. 2   Line 31   after "track", insert --)--

Col. 4   Line 50   "or" in the second instance, should be -of-

Col. 5   Line 65   "24"   should be --25--

Col. 10  Line 48   "trackss"   should be --tracks--

Col. 12  Line 55,  between "chocks" and "to", insert --with respect--

Col. 13  Line 1    "eongated"   should be --elongated--

Signed and Sealed this

Twenty-fifth Day of September 1979

[SEAL]

Attest:

LUTRELLE F. PARKER

Attesting Officer      Acting Commissioner of Patents and Trademarks